Jan. 9, 1951     I. H. KENDALL     2,537,835
ANTISKID DEVICE FOR TIRES
Filed June 5, 1948
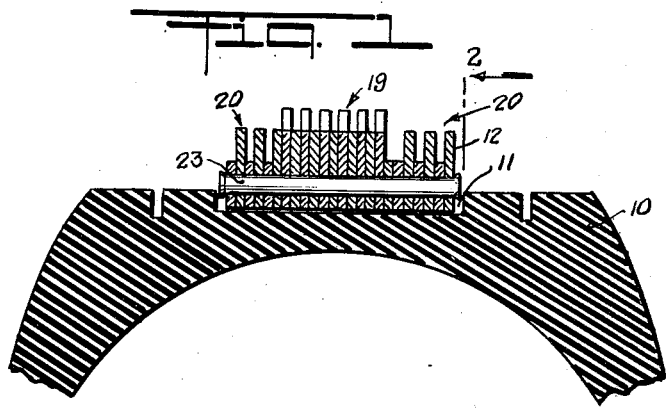
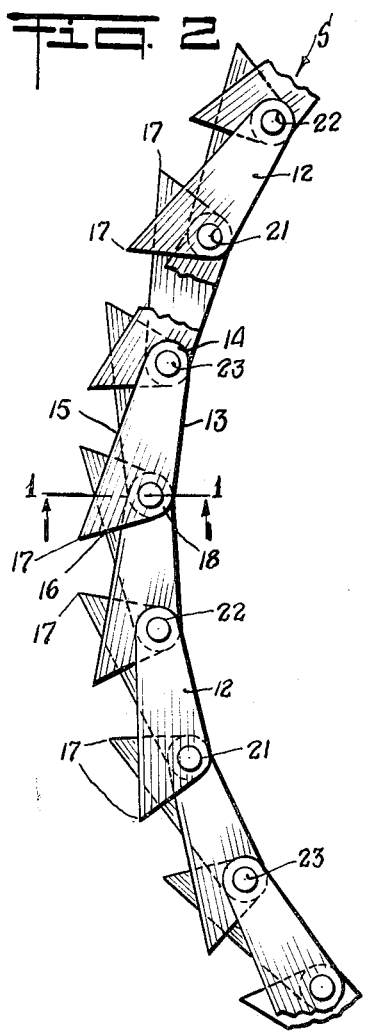
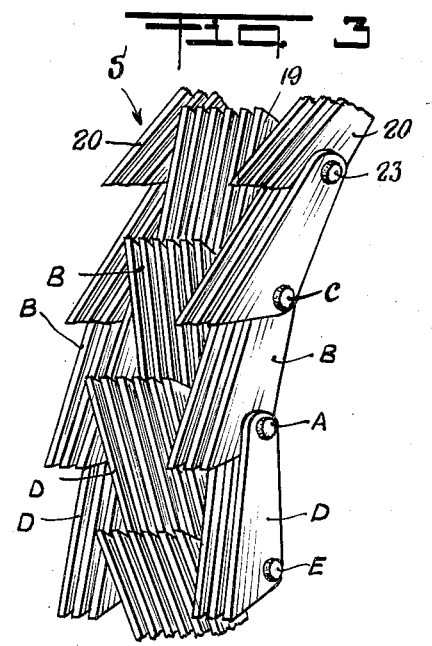
INVENTOR.
IRA H. KENDALL
BY Mock & Blum
ATTORNEYS Patented Jan. 9, 1951

2,537,835

UNITED STATES PATENT OFFICE 2,537,835

ANTISKID DEVICE FOR TIRES

Ira H. Kendall, Potsdam, N. Y.; Harold M. Kendall executor in re estate of Ira H. Kendall, deceased Application June 5, 1948, Serial No. 31,313

5 Claims. (Cl. 152—182)

My invention relates to improvements in antiskid devices for motor vehicle tires and, in particular, to devices of this character which are composed of relatively small and interfitting flexible link elements which can be secured to and detached from motor vehicle tires.

The anti-skid devices in use today are generally of the type which comprise a series of interlocked chains which, in order to be secured to the tire, must extend around the entire inner surface as well as the outer surface of said tire. Thus, only a very small part of the chain area is actually used to perform an anti-skid function. In addition, this type of device is bulky, unwieldy and difficult to secure or remove from the tire. Furthermore, the links of said chains are usually adapted to lit flat against the outer periphery of the tire, thus affording a very limited degree of traction and retarding friction to the tire in motion.

Accordingly, it is an object of my invention to provide an anti-skid device which may be readily and conveniently secured to and removed from motor vehicle tires.

Another object of my invention is to provide an anti-skid device of the character described which is of relatively small dimension, compact in shape and easily and readily manipulated, the entire width of which is utilized in performing its mechanical function.

Still another object of my invention is to provide an anti-skid device which can be cheaply and easily made from a minimum number of parts, each of the component parts of said device being of equal shape and size, which can be quickly and inexpensively assembled.

A further object of my invention is the provision of an anti-skid device of the character described which is composed of alternate and opposed interlocked banks of links, alternately attached in such a manner that, when secured to a tire, a portion of said banks act as traction devices to provide a forward thrust for the car while the remaining banks act as a retarding element which prevents the car from slipping backward.

These and other objects of my invention will be readily apparent from the foregoing specification when taken in connection with the accompanying drawings, in which, Fig. 1 is a sectional view taken alone line 1—1 of Fig. 2, showing the anti-skid device in its attached position on the automobile tire;

Fig. 2 is a side elevational view of the antiskid device in the curved position in which it would be attached to the tire, one of the banks of links being broken away to reveal the relative position of the adjacent bank of links; and Fig. 3 is an enlarged front perspective view of a portion of the anti-skid device showing the relative arrangement of the banks of links.

According to my invention, I utilize a specially constructed tire 10 having a centrally-disposed circumferential groove 11. I have found that the best results may be obtained by cutting said grooves approximately ⅜" deep and approximately 1¾" wide, although it is to be understood that the tire or device S is not to be limited to any specific dimension. The said groove 11 extends completely around the circumference of the said tire 10.

My anti-skid device S is adapted to fit within the circumferential groove of said tire and extends completely around said tire. The said device S is composed of a series of preferably metal links 12, each of said links having a flat lower edge 13, a curved rear portion 14, an inclined upper edge 15, and a front end 16. The front upper portion of the link 12 forms a sharp point 17 at the juncture of upper edge 15 with the front end 16. The front lower portion 18 is curved at the juncture point between the front end 16 and the bottom edge 13. As shown in Fig. 3, the said links 12 are arranged in groups or banks, the links composing said banks being parallel and alined and spaced from each other. According to the preferred embodiment illustrated, the width of said anti-skid device comprises preferably three of said banks or units of links, consisting of two narrow banks on the outer ends of the device and a relatively thick bank between the said two end banks. The intermediate or center bank 19 is preferably composed of six alined and parallel links, while the end banks 20 are each composed of three similarly arranged links. The links of the banks 19 and 20 are arranged in opposed relation to each other; that is, with the points 17 extending in opposite directions as shown in Fig. 2. Each of said links is provided with two circular holes, one hole 21 being located adjacent the front lower edge of said link and the other hole 22 being located adjacent the round rear portion of said link. When the banks of links are alined as shown in Fig. 3, and as described previously, a pin 23 is inserted through the said alined holes of the said links. The ends of each pin 23 are flanged as shown in Figs. 1 and 3. It will be noted that in each of the outside rows of banks the rear holes 22 of one bank are alined with the front holes 21 of the adjacent bank, the links of the former bank being alternately arranged between the links of the latter bank. This arrangement is also followed in the intermediate or center row of banks with the effect that when the pin is inserted in the alined holes as shown in Fig. 3, the said pin passes through all of the links of the three adjacent banks, preferably twenty-four links.

The aforementioned construction makes possible the following operation of the anti-skid device:

The units or banks of links adjacent the pin marked A in Fig. 3, may be rotated about said pin. The three upper banks marked B being secured at their upper ends by the pin C, move in unison, maintaining their relative positions with regard to each other; the individual links comprising each of the banks B also retaining their alined parallel positions in relation to each other, similarly the lower banks marked D being secured at their lower ends by pin E likewise retaining their fixed positions as above-described.

As is apparent from Fig. 2, when the device S is placed in its operative position around the circumference of the tire 10, the various banks of links will assume the form of the tire. When in this position, the points 17 of the links 12 will protrude, the points of the outside or end banks pointing in a counterclockwise direction and the points of the intermediate banks pointing in a clockwise direction. The chain is so constructed that when placed in attached position in the groove 11 of the tire 10, the points 17 preferably project approximately ¼" beyond the outside circumferential surface of said tire 10. Obviously, the said device S must be of sufficient length to encircle the entire tire. The said device S may be fixedly attached to the tire by constructing all of the pins 21 with flanged edges as described previously. If a removable connection is desired, the pins at one point in the device may be provided with spring detents or any other conventional means for removably securing said pin through the holes in the adjacent rows of banks.

Since the links 12 of the outer or end banks are positioned with their points 17 directed in a counterclockwise fashion when the wheel rotates in its normal clockwise direction, the said outer or end banks provide the forward thrust for the said wheel, the points 17 digging into and gripping the snow or ice on the forward motion of the motor vehicle. The intermediate or center bank of links 19 provide a retarding or anti-skid means for the car. The points of said banks 19 being directed in a counterclockwise direction, said points dig into the snow or ice upon any rearward motion of the motor vehicle, as when said vehicle tends to slip upon hills, etc.

While a preferred embodiment of the invention is shown and described herein, it is obvious that numerous departures, omissions and additions may be made in the said invention, without departing from the spirit and scope thereof.

I claim:

1. An anti-skid device comprising a plurality of plate-like links arranged in parallel and longitudinal rows to form a continuous flexible chain, each of said links having a pair of edges which meet at an acute angle defining an inclined projecting ground-gripping portion, each of said links having longitudinally-spaced holes respectively located at the front and rear ends thereof, said links being arranged in interfitting relationship to each other with the respective holes thereof in alinement, and a series of pins extending transversely through said chain through the holes of said links, and interconnecting said links.

2. An anti-skid device comprising a plurality of plate-like similarly-shaped links arranged in parallel and longitudinal rows to form a continuous flexible chain, each of said links having an inclined top edge, an inclined front edge and a straight bottom edge, said inclined front edge and top edge meeting at an acute angle defining an inclined projecting sharp front corner, each of said links having a pair of longitudinally-spaced holes respectively located at the front and rear ends thereof, said links being arranged in interfitting relationship with each other, with the front hole of each link registering with the rear holes of the subsequent longitudinally adjacent links, and a series of pins extending transversely of the chain through the holes of the links and interconnecting all of said links.

3. An anti-skid device comprising a plurality of plate-like links arranged in parallel and longitudinal rows to form a continuous flexible chain, each of said links having an inclined top edge, an inclined front edge and a straight bottom edge, said inclined front edge and top edge meeting at an acute angle defining an inclined projecting sharp front corner, each of said links having a pair of longitudinally spaced holes respectively located at the front and rear ends thereof, said links being arranged in longitudinal rows of banks, the links of each row of banks facing in an opposite direction to the links of the adjacent rows of banks, the front ends of the links of each bank interfitting between the rear ends of the links of the subsequent longitudinally-adjacent banks with the respective holes of said links registering, the holes of the links of each row of banks registering with the holes of the links of the adjacent rows of banks, and a series of pins extending transversely through the alined holes of said links and pivotally connecting each bank with its longitudinally-adjacent bank.

4. In combination with a tire having a peripheral groove, an anti-skid device within said groove and extending around the circumference thereof, said anti-skid device comprising a plurality of plate-like links arranged in longitudinal rows to form a continuous flexible chain, each of said links having a pair of edges which meet at an acute angle defining an inclined projecting sharp front corner, each of said links having longitudinally spaced holes respectively located at the front and rear ends thereof, said links being arranged in interfitting relationship to each other with the respective holes thereof in alinement, and a series of pins extending transversely through said chain, through the holes of said links, and interconnecting said links, the inclined front corners of said links projecting from said groove beyond the circumferential surface of said tire.

5. In combination with a tire having a peripheral groove, an anti-skid device sized to fit within and extend around the circumference of said groove, said anti-skid device comprising a plurality of plate-like links arranged in longitudinal rows to form a continuous flexible chain, each of said links having an inclined top edge, an inclined front edge and a straight bottom edge, said inclined front edge and top edge meeting at an acute angle defining an inclined projecting sharp front corner, each of said links having a pair of longitudinally spaced holes respectively located at the front and rear ends thereof, said links being arranged in interfitting relationship with each other with their respective holes in alinement, the center portion of the chain having a plurality of said rows with the inclined front corners of the links facing in the same direction, the outer portions of the chain each having a plurality of rows with the inclined front corners of the links facing in the opposite direction, and a series of pins extending transversely through the holes of said links and interconnecting all of said rows, the front edges of said links being sufficiently long to enable the inclined front corners of said links to project beyond the circumferential surface of the tire.

IRA H. KENDALL.

REFERENCES CITED

The following references are of record in the file of this patent:

UNITED STATES PATENTS

| Number | Name | Date |
|---|---|---|
| 1,145,305 | Graves | July 6, 1915 |

FOREIGN PATENTS

| Number | Country | Date |
|---|---|---|
| 11,771 | Great Britain | May 21, 1904 |